United States Patent [19]
von Holdt

[11] Patent Number: 5,798,130
[45] Date of Patent: Aug. 25, 1998

[54] ADJUSTABLE MOLD GATE

[75] Inventor: John W. von Holdt, 6864 Lexington La., Niles, Ill. 60648

[73] Assignee: John W. Von Holdt, Niles, Ill.

[21] Appl. No.: 693,866

[22] Filed: Aug. 5, 1996

Related U.S. Application Data

[63] Continuation-in-part of Ser. No. 523,381, Sep. 5, 1995.

[51] Int. Cl.⁶ .......................... B29C 45/17; B29C 45/20
[52] U.S. Cl. .......................... 425/549; 425/564; 425/566; 264/328.15
[58] Field of Search .................. 425/549, 564, 425/566; 264/328.8, 328.9, 328.14, 328.15, 328.11, 328.12

[56] References Cited

U.S. PATENT DOCUMENTS

| | | | |
|---|---|---|---|
| 4,588,367 | 5/1986 | Schad | 425/549 |
| 4,687,613 | 8/1987 | Tsutsumi | 425/549 |
| 4,781,572 | 11/1988 | Boring | |
| 5,078,589 | 1/1992 | Osuna-Diaz | |
| 5,141,155 | 8/1992 | Jacobsen | |
| 5,141,969 | 8/1992 | Osuna-Diaz | |
| 5,208,052 | 5/1993 | Schmidt et al. | 425/549 |
| 5,231,378 | 7/1993 | Gellert | |
| 5,378,138 | 1/1995 | Onuma et al. | 425/549 |
| 5,443,381 | 8/1995 | Gellert | 425/549 |
| 5,501,594 | 3/1996 | Glozer et al. | 425/549 |

OTHER PUBLICATIONS

Osco's Exclusive Adjustable Mold Flow System by Osco Inc. 24 pages–Brochure.
Brochure relating to the "Dan–Tip Hot Runner System" dated Aug., 1993 at the latest—6 pages.

*Primary Examiner*—Angela Ortiz
*Attorney, Agent, or Firm*—Banner & Witcoff Ltd

[57] ABSTRACT

A mold gate and a method of using the same, in which the mold gate has an adjustable-area and width, annular access opening to each mold cavity. As the area is adjusted, the flow of molten plastic to the cavity is controlled for the injection molding of plastic parts. The adjustment may be made by rotating an outer rotary bushing relative to an inner stationary bushing, which is surrounded by the outer rotary bushing in one embodiment, and which projects beyond it in another. The position of a hot probe is thus controlled to vary the area of the access opening. Cooling lines in the vicinity of the hot probe may be provided for significant improvement of operation. Also, a method is disclosed in which the gate operates without closure by means of metal parts. Rather, the frozen molding compound itself serves to close the gate between mold shots.

12 Claims, 5 Drawing Sheets

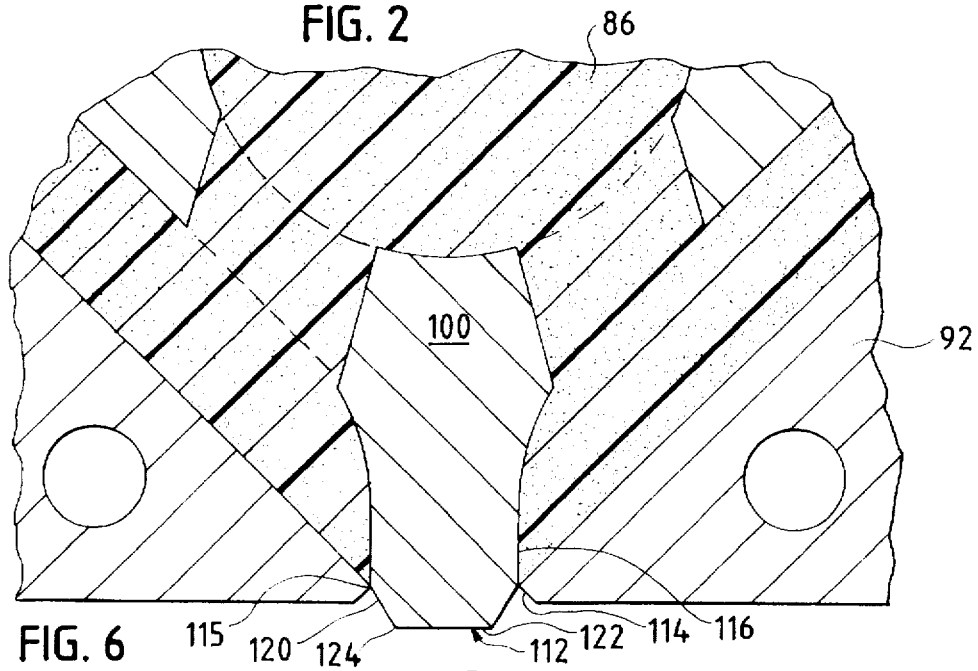
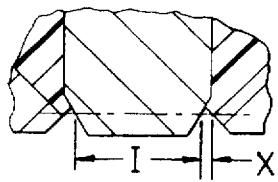
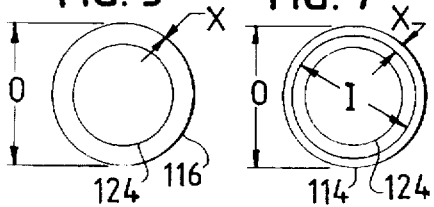
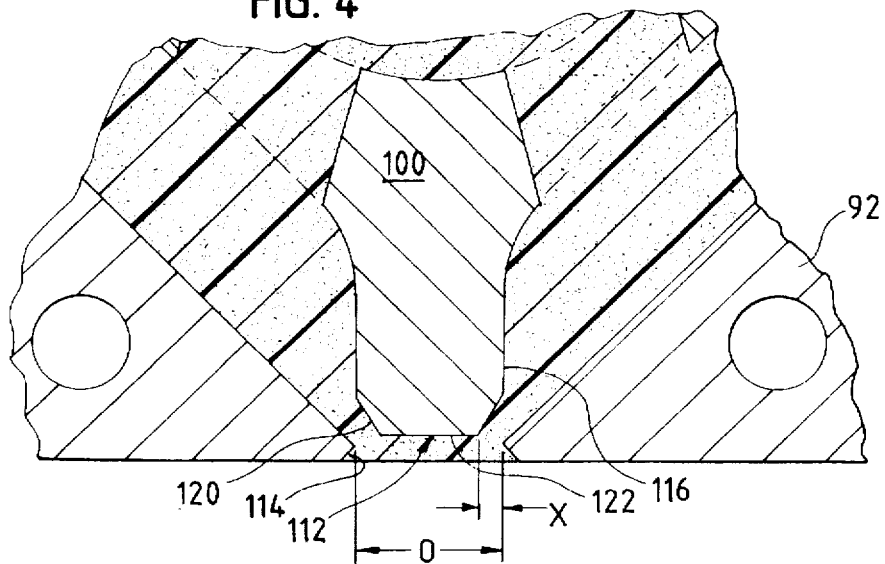

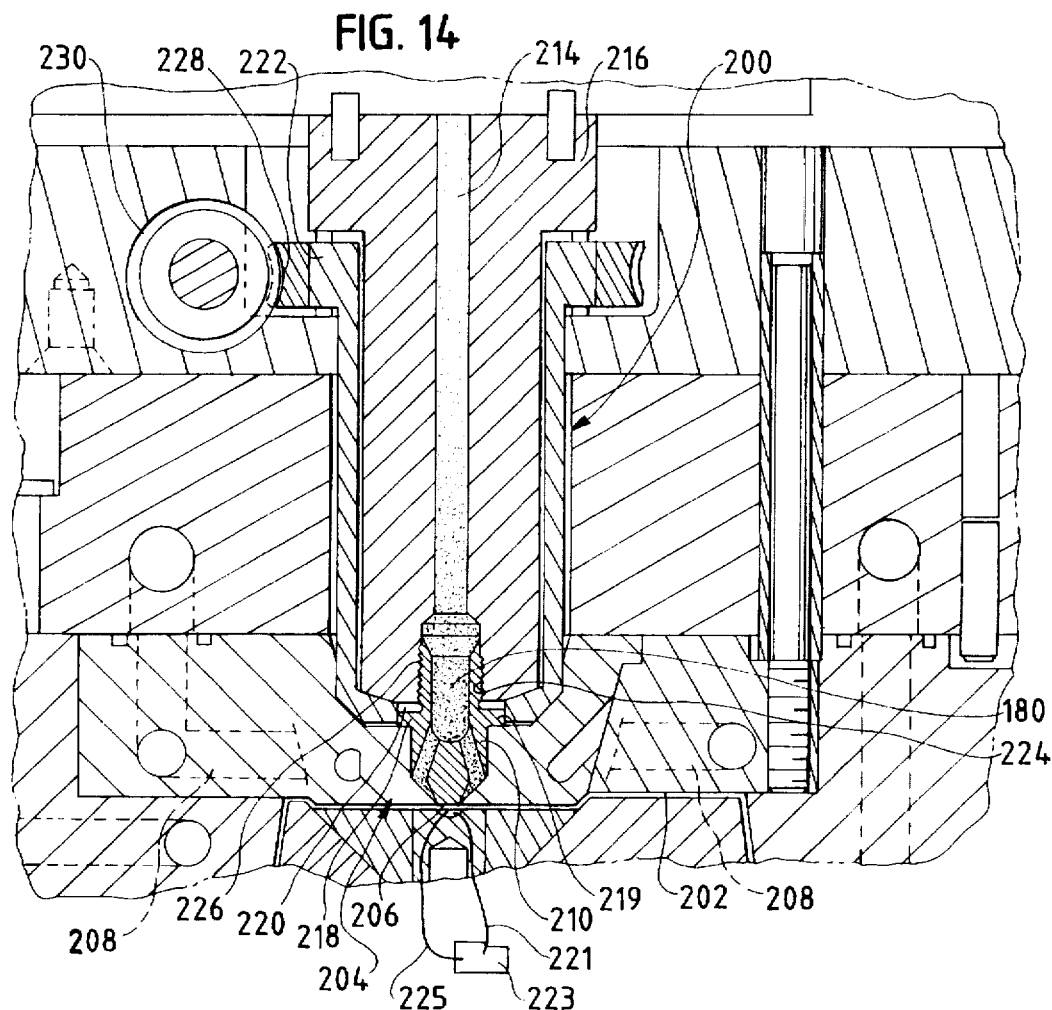
FIG. 14
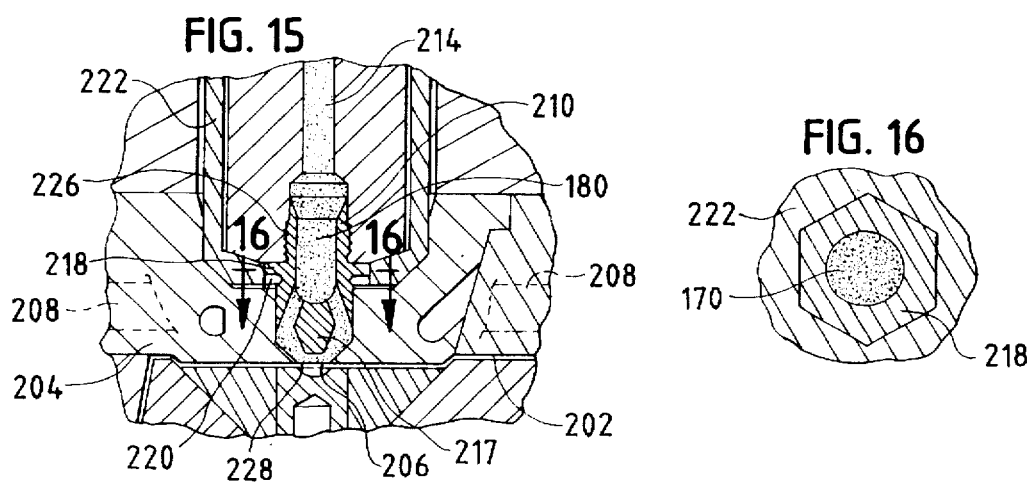
FIG. 15
FIG. 16

ADJUSTABLE MOLD GATE

CROSS REFERENCE TO RELATED APPLICATION

This is a continuation-in-part of co-pending application Ser. No. 08/523,381, filed Sep. 5, 1995.

BACKGROUND OF THE INVENTION

The present invention relates to mold gates for controlling the flow of molten plastic into a cavity of a mold for injection molding of plastic parts, as for example, plastic buckets. In typical commercial operations, multiple molding chambers are provided so that several molded products can be produced in a single molding cycle. Normally, each such molding chamber will have its own mold gate to control the flow of molding compound into a molding cavity or chamber.

By this invention, a simple, quick-adjusting, reliable, variable-sized mold gate system is provided. This allows the injection molder to fill a mold cavity in such a manner and within a cycle time as to accomplish three objectives simultaneously, preferably without the movement of mechanical valve parts in the gate while the mold is operating. First, it becomes possible to fill the mold cavity to produce a part of predetermined wall thickness, length of flow, and plastic material rheology at temperatures and pressures that do not degrade the plastic material in the molding process. Secondly, it becomes possible to "pack out" the part without creating internal stresses in the molded part. Third, plastic in the gate and the plastic of the molded part wall freezes simultaneously.

One object of the present invention is to provide an improved mechanism for adjusting a mold gate in order to increase or reduce the flow rate of the molten plastic into the mold cavity. In accordance with one embodiment of the invention, such adjustment is achieved manually by use of a hand tool when the mold is open at the parting line. Such an adjustment feature is desirable where a very large number of cavities and mold gates are utilized, for example; with a mold having 48 cavities and corresponding gates.

Another embodiment of the present invention permits adjustment of a mold gate from outside the mold so that such adjustments can be made without opening the mold. In accordance with one design, such outside gate adjustment mechanism is used when 16 mold cavities and gates are utilized.

Each of the foregoing embodiments of the invention offers significant advantages over known molds which must be disassembled in order to adjust the opening of a mold gate.

Prior art mold gates customarily have mechanisms for opening or closing down the size of a flow area to a central hole which leads to a mold cavity. However, while adjustment of the flow area leading to a round opening communicating with the mold cavity may serve to regulate such flow, the final opening is fixed in size so that such regulation is limited.

Von Holdt U.S. patent application Ser. No. 08/523,381, filed Sep. 5, 1995, discloses an adjustable mold gate which will adjust the size of a final, annular opening through which molten plastic flows into the mold cavity so that the opening is not a constant as in prior designs. This application also provides a mold gate which can be adjusted so that by the time the molten plastic in the mold cavity has hardened by an amount sufficient to eject the part, the plastic in the area of the mold gate will also be sufficiently hardened so that the length of a mold cycle need not be extended in order to await hardening of the plastic in the mold gate area. In particular, the mold gate opening comprises the annular passage defined by an outer diameter and an inner diameter, between which the annular passage is defined for the flow of molten plastic. For a given area of gate opening, such an annular passage will permit molten plastic to cool more rapidly than where the mold opening comprises a round hole, because in the latter case the resulting round piece of plastic, which must harden in the gate area before the next cycle can begin, will not cool rapidly in the middle of such a piece. In contrast, an annular ring of plastic in the mold gate area will cool more rapidly so as to avoid the need to extend the mold cycle simply to permit cooling of the plastic in the gate area.

DESCRIPTION OF THE INVENTION

By this invention, a mold gate is provided for controlling the flow of molten plastic to a mold cavity for injection molding of plastic parts. By this invention, an outer mold gate member is provided, having a central opening at an inner end through which molten plastic flows to a mold cavity. A hot probe is centrally disposed adjacent to the central opening, to define an annular passage between the hot probe and wall of the central opening. The hot probe is longitudinally adjustable relative to the outer mold gate member to vary the area of the annular passage. Furthermore, apparatus is provided for longitudinally adjusting the position of the hot probe, to adjust the area of the annular passage at the discretion of the user, and thereby to control the flow of molten plastic to the mold cavity. By this invention, the outer mold gate member may carry cooling water lines to facilitate the cooling of plastic adjacent the hot probe and in the mold cavity.

Preferably, the hot probe is seated in a rotatable inner mold gate unit, to be rotatable along with the inner gate unit and to be also longitudinally movable relative to the outer mold gate member. The longitudinal movement may provided by the hot probe being threadedly engaged with a stationery inner bushing. Thus, rotation of the inner mold gate unit and the hot probe together causes the hot probe to move longitudinally, as guided by the threaded interengagement with the inner bushing.

Thus, the area of the annular passage into the mold cavity can be varied on a moment-by-moment basis, if desired, by rotating the inner mold gate unit, a portion of which may be accessible to permit such rotation by an engaging gear or the like.

The cooling water lines adjacent the hot probe and the annular passage facilitate rapid cooling in that area, so that it becomes possible for molding compound in the annular passage to freeze simultaneously with the molding compound in the mold cavity, so that no metal parts are needed to close the mold gate between shots. The frozen plastic serves as a plug to seal the molten molding compound in between shots. Then, when a new shot is desired, the rush of hot molding compound will break through the plug provided by the tiny amount of frozen molding compound, remelting it as the mold cavity is once again refilled, to repeat the process.

Thus, molding of plastic parts can take place by passing molten plastic through a mold gate into a mold cavity, and allowing the plastic to cool. This method comprises the steps of: passing liquid molding compound through the mold gate in an annular flow path to fill the mold cavity; allowing the plastic material in the mold cavity and the mold gate to solidify by cooling; and removing the newly molded plastic part from the mold cavity, including the step of severing the plastic in the mold gate, and ejecting the part without closing the gate with a metal gate-closing member. The severing process may be done in tension, or in shear, as may be desired.

Specifically, a method of injection molding of plastic parts by flowing molten plastic through a mold gate into a mold cavity is provided. The method comprises the steps of: (a) providing an opening in the mold gate leading to the mold cavity to conduct molten plastic thereto; (b) aligning a hot probe member adjacent to the opening, the hot probe member being movable between variable positions to convert the opening into an annular opening of varying area depending upon the position of the hot probe member; (c) adjusting the position of the hot probe member to a specific, desired position; (d) molding a plastic part under molding parameters whereby the plastic part is fully formed in the mold cavity. The parameters include the usual molding parameters of temperature, molding pressure, setting time, and the like. However, the position of the hot probe member and the specific area of the annular opening is not included in the phrase "molding parameters" as used here. The general idea is to hold other parameters constant, while adjusting the area of the mold gate annular opening to achieve the desired results without the need for a metal gate-closing member. The plastic itself serves as the gate closing member between shots.

Following this, another step (e) of the process is: slightly moving inwardly said hot probe member to reduce the area of said annular opening; (f) molding another plastic part in the mold cavity under said molding parameters; and repeating steps (e) and (f) until the plastic part fails to fully form. Then, one follows with the step (g) of slightly moving the hot probe member outwardly again to achieve a position where the plastic parts are fully formed with each mold shot; followed by (h) molding a plurality of the plastic parts at said molding parameters without moving said hot probe member. Under those conditions, the mold gate will be closed by the freezing of hot plastic in the annular opening between each mold shot, and one can expect good, fully formed plastic parts to be manufactured at optimum speed.

The foregoing and other objects and advantages of the invention will be apparent from the following description of certain preferred embodiments thereof, taken in conjunction with the accompanying drawings.

DESCRIPTION OF THE DRAWINGS

FIG. 2 is an enlarged, fragmentary, vertical section of the gate area of the embodiment of FIG. 1 with a hot probe member being shown in its lowered, fully closed position;

FIG. 3 is a bottom view of the structure shown in FIG. 2;

FIG. 4 is a view similar to FIG. 2 showing the hot probe member in its raised, fully open position;

FIG. 5 is a bottom view of the structure shown in FIG. 4;

FIG. 6 is a fragmentary, vertical section similar to the lower end of FIGS. 2 and 4 showing the hot probe member in an intermediate, partially open position;

FIG. 7 is a bottom view of the structure of FIG. 6;

FIG. 14 is a fragmentary, sectional view of another embodiment of a mold gate, mounted in a molding system, the gate being closed;

FIG. 15 is a similar, fragmentary view of the gate of FIG. 12, but in the open position; and FIG. 16 is a sectional view taken along line 16—16 of FIG. 14.

DESCRIPTION OF THE SPECIFIC EMBODIMENTS

Figure 1:
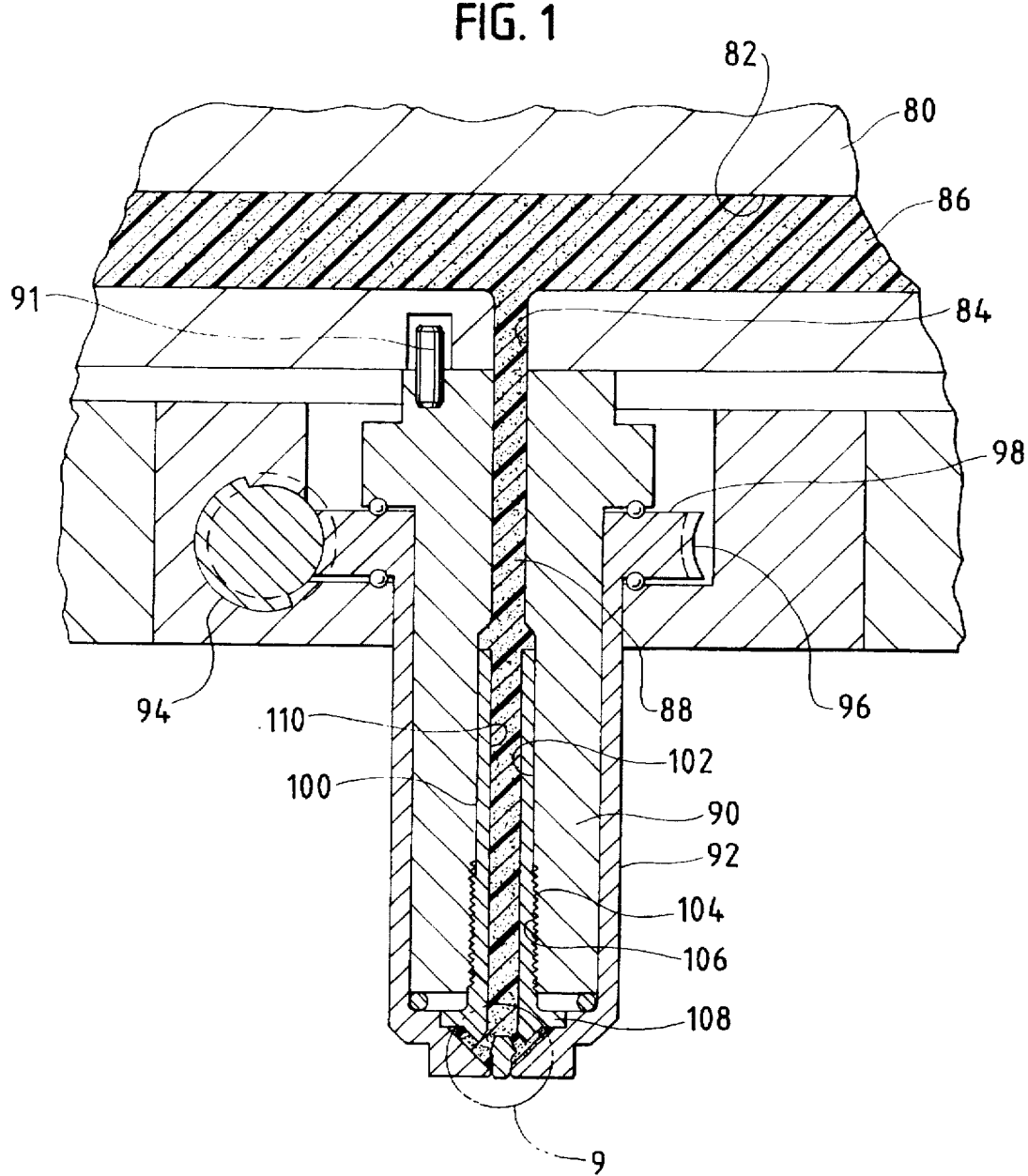
FIG. 1 is a fragmentary vertical sectional view of part of a molding system showing an embodiment where the mold gate opening itself is adjustable from outside the mold.

Reference is now made to FIGS. 1–6 which disclose an embodiment where the final opening from the gate to a mold cavity comprises an annular passage which can be adjusted to various sizes. FIG. 1 shows a hot manifold 80 having passages 82 and 84 through which molten plastic 86 flows on its way to a mold cavity (not shown) for the molding of plastic parts. The molten plastic flows down through a central opening 88 in a stationary hot sprue bushing 90 which is keyed to the fixed hot manifold 80 by a key or pin shown at 91.

A rotary gate bushing 92 is tubular in shape and surrounds the stationary hot sprue bushing 90. The rotary gate bushing 92 is rotatable from outside the mold by a worm gear 94, which meshes with gear teeth 96 formed on the outside of a flange 98 at the upper end of rotary gate bushing 92.

A hot probe 100 is positioned in an opening 102 in the stationary hot sprue bushing 90 and its lower end has external threads 104 which mesh with internal threads 106 formed in the opening 102. Adjacent the lower end of hot probe 100 there is formed a hexagonal flange 108 which sits in a similarly shaped recess adjacent the lower end of rotary bushing 92. As a result, the hot probe 100 rotates conjointly with the rotary bushing 92.

Moreover, due to the threaded connection between the hot probe 100 and the hot sprue bushing 90, rotation of the hot probe 100 causes it to move vertically within the stationary bushing 90. Therefore, rotation of the rotary gate bushing 92 by the worm gear 94 will cause the hot probe 100 to move upwardly and downwardly between an open gate position and a closed gate position. The hot probe 100 has a central passage 110 through which the molten plastic 86 flows, and when the gate is open, the plastic flows out through the bottom of the rotary bushing 92 to a mold cavity (not shown).

FIGS. 2–6 illustrate the lower end of the gate assembly shown in FIG. 1 so as to show the manner in which the gate is opened and closed including the manner in which the final opening to the cavity can be adjusted in size. FIG. 2 shows a fully closed position in which the hot probe 100 (carried by a spider support) is in its lowermost position and a lower end 112 is in a position to seal off a central opening 114 formed at the bottom of the rotary gate bushing 92. The wall of central opening 114 forms an annular, sharp point to define essentially an annular, linear seal 115 of point like cross-section. This facilitates tearing away of each molded component after molding.

The lower end 112 of the hot probe 100 includes a round section 116 having an outer diameter approximately equal to the minimum diameter of the opening 114 in the bushing 92. As a result, when the hot probe 100 is in its lowermost position as shown in FIG. 2, the section 116 of the hot probe closes off the round opening 114 so that molten plastic cannot flow through to the mold cavity.

In contrast with the foregoing. FIG. 4 shows the hot probe 100 in its fully raised position in which an annular passage is created between the opening 114 and the lower end 112 of the hot probe. In FIG. 4, the letter "O" is shown as representing the minimum diameter of the opening 114 in the lower end of the rotary bushing 92. Below the section 116, the lower end of hot probe 100 is tapered inwardly as shown at 120 and it terminates in a reduced diameter flat bottom 122. FIG. 4 uses the letter "X" to designate the width of an annular passage through which molten plastic can flow in the fully open position of FIG. 4.

FIG. 3 is a bottom view of FIG. 2 showing the fully closed position so that the width "X" of the annular passage is zero, the outer diameter of the lower end of the hot probe 100 being shown at 116 and the reduced diameter being shown at 124. Because the outer diameter 116 of the hot probe is approximately equal to the minimum diameter of the round opening 114, the gate is closed.

FIG. 5 is a bottom view of FIG. 4 showing the fully open position, the letter "O" represents the diameter of the opening 114, and 124 represents the reduced diameter of the extreme lower end of the hot probe 100, so that the difference between the two which is indicated as "X" designates the width of an annular passage through which molten plastic may flow.

FIG. 6 shows an intermediate position where the lower end 112 of the hot probe is intermediate the closed position of FIG. 2 and the fully open position of FIG. 4. FIG. 7 is a bottom view of FIG. 6 and in both FIGS. 6 and 7 the letter "T" is used to designate the diameter of that portion of the lower end 112 of the hot probe which is in line with the round opening 114 at the lower end of rotary bushing 92. Thus, the difference between the "T" diameter and the diameter 114 of the central opening determines the width "X" of an annular passage.

Figure 13:
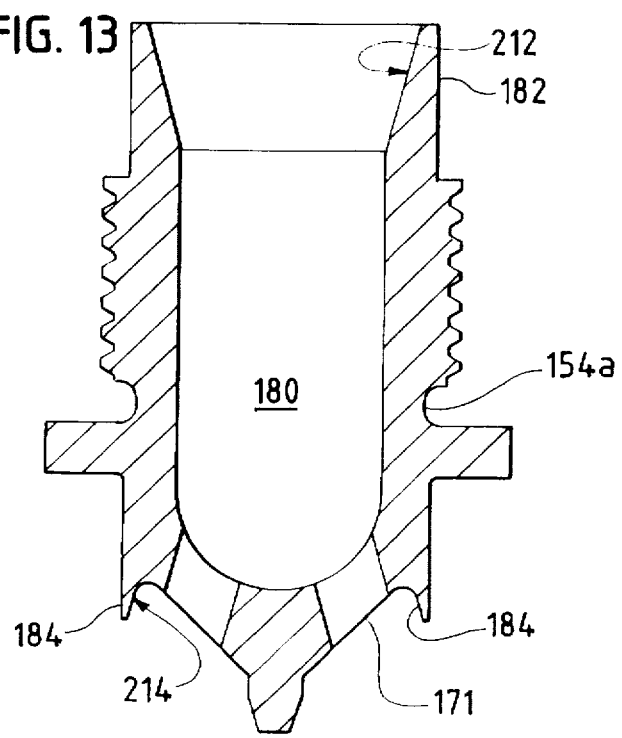
FIG. 13 is a detailed sectional view of the hot probe member.

It will thus be understood that due to the tapered lower end 112 of the hot probe 100, when in the lowered position of FIG. 2 the opening 114 is closed, when in the fully raised position of the hot probe 100 as shown in FIG. 4, the width "X" of the annular passage is a maximum, and in an intermediate position as shown in FIGS. 13 and 14, the width "X" creates an annular open passage, but "X" is less than in the fully open position of FIGS. 4 and 5.

The gate portion formed between angled surfaces 114, 120 creates a valve section out of frozen mold material on the outer surface of each molded part, which prevents any more flow of plastic material into or out of the mold cavity. The thinnest portion of the frozen plastic, at the dimension X, will break away upon opening of the mold, leaving a thin skin remaining between the angled surfaces 114, 120, which prevents the gate from drooling during mold open time. Under optional functioning conditions, most of the frozen portion will be removed from the gate along with the part. This is easily accomplished because of the outwardly angled surfaces 114, 120 so that molding compound is not trapped, but easily separated. The advantage of this is created by the frustoconical shape of surface 120 at the forward tip of hot probe 100.

The remaining thin section of frozen plastic which prevents the gate from drooling will be pressed through and melted by hot molding compound on the next pressurized injection shot.

The angle of frustoconical tip 120 on the hot probe may vary as desired according to the rheology of the plastic material, to facilitate breakaway of the plastic at a desired location on the opening of each mold.

The foregoing feature of the invention is of considerable importance for several reasons. One major advantage is that the final opening to the mold cavity can be adjusted in size. The outer diameter of the annular passage is the diameter 114 of the opening which is fixed, but the inner diameter of the annular passage is the diameter of that portion of the tapered lower end of the hot probe 100 which is in line with the diameter 114, and that inner diameter varies due to the taper 120 of the lower end 112 of the hot probe, depending on the vertical position thereof.

The embodiment of FIGS. 1–7 is particularly suited for use in the injection molding of thin-walled objects such as thin-walled buckets. In the molding of a plastic part, it is important to completely fill the mold cavity before the molten plastic begins to harden due to cooling as it enters the mold. If an operator unduly increases the speed or pressure of the molten plastic to reduce the time for filling a mold cavity, that will increase the heat of the plastic and possibly degrade the material, which can then increase the cooling time, which means lengthening the mold cycle. The material must cool and harden before a part can be ejected and the next cycle begun.

The tubular passage created by the embodiment of FIGS. 1–7 solves the foregoing problem. The velocity or volume of plastic flow depends on the area of the opening leading to the mold cavity. As the hot molten material passes through the gate, it is desirable that the material cool rapidly in order to reduce the cycle time. Where the opening to the cavity is a single round opening, the surface area of the gate is relatively small so that absorption of heat is limited. In contrast, with an annular passage of the same open area, the gate surface area available to receive heat from the plastic is substantially larger, so that cooling time will be reduced.

It is desirable to force plastic material into a mold cavity as fast as possible without unduly increasing the heat of the material. If you have only one round hole leading to the cavity, an operator can increase the flow rate only by opening up the opening or attempting to force the material through faster. If you force the material through faster, you create frictional heat so the temperature of the molten material flowing through the gate may be higher than the incoming material supplied to the gate. As noted above, such an increase in temperature can cause problems of degradation and stress, and can increase the cooling time.

On the other hand, if the gate opening is a round hole, and one increases the size of that hole, the result, after filling a cavity, will be that there is a large mass of material in the gate area filling the hole so that the time for that plastic in the gate area to freeze is increased significantly. Thus, opening up a round hole in a gate opening to get faster filling of a cavity can result in slower freezing of the plastic in the gate area, and an operator cannot begin the next cycle until that material freezes.

An important advantage of the present invention is that, instead of simply opening up a round opening by increasing its diameter, the present invention utilizes an annular opening or tubular gate which can be increased in diameter without increasing the time for plastic material in the gate area to freeze so the next cycle can begin. Thus, by using an annular opening in the gate, one can increase the flow rate and achieve faster filling of a mold cavity without the disadvantage of forcing material at an increased rate so as to produce friction heat, and without the disadvantage of having a large mass of molten material in the gate area which increases freezing time at the gate.

Also, because of the tapered lower end of the hot probe 100 in FIGS. 2 and 4, an operator can vary the size of the annular opening by simply moving the hot probe vertically between the closed position of FIG. 2 and the fully open position of FIG. 4. Also, when the hot probe 100 is moved to an intermediate or partly open position as in FIG. 6, the relatively small annular passage is very short at its minimum size (at edge 115) and thus reduces the creation of friction. In contrast, as the prior art probe is moved down toward a closed position, a relatively long, narrow, conical flow area is created leading to its the opening, with the result that forcing the molten material through such a long and narrow flow area tends to create more frictional heat.

The foregoing invention is especially adapted for the molding of thin-walled objects such as thin-walled containers or buckets. The reason is that in the molding of thin-walled containers, it is necessary to inject the plastic material at a higher pressure in order to completely fill the mold cavity before the materials freeze. It is important to be able to do that without creating frictional heat and stress because of the molten plastic being forced through the gate at higher velocity and pressure as needed to fill a thin-walled cavity before freezing occurs in the cavity. In the thin-walled cavity, the molten plastic will freeze more rapidly than in other types of cavities, and the cavity must be filled before such freezing occurs. Thus, the use of a tubular gate or annular gate passage offers major advantages in the injection molding of thin-walled containers or other objects.

In operation, the adjustable mold gate shown in FIGS. 1-7 is preferably not closed at the end of a cycle. The preferred method of operating the gate of FIGS. 1-7 is to adjust the annular or tubular gate opening to desired degree of opening, and then to leave it in that position, as opposed to opening and closing the gate each cycle.

Thus, referring to FIG. 4, the hot probe 100 is set to a desired open position as shown in that figure, or in an intermediate position as shown for example in FIG. 6, a cycle begins by injecting molten plastic through the annular passage or tubular gate defined between the tapered lower end of the hot probe 100 and the minimum diameter of opening 114, the mold cavity is filled, and the plastic in the mold cavity and in the gate area is allowed to freeze. After such freezing occurs, the mold is opened and the part is ejected.

Referring again to FIG. 4, the ejected part will include a small amount of plastic disposed immediately beneath the hot probe 100 as shown in FIG. 4, which piece will break away in tension across the distance shown as "X". After the part has been ejected, molten plastic will again be passed through the annular gate opening and into a mold cavity for the next cycle without need to close and open the gate which remains in a selected partially open position.

In using the mold gate of FIGS. 2-7, an operator will know and provide desired molding parameters such as; the cavity wall thickness, the viscosity of the molten material, and the flow distance of a thin wall container to be molded, and assuming an efficient mold cooling arrangement, the approximate gate size and temperature of the plastic going through the gate can be calculated using a definite injection pressure that will fill the cavity to make a container to desired specifications at the fastest cycle.

The foregoing adjustable gate was designed to permit fine tuning of the gate size to achieve cavity-to-cavity fill time balance, and at the same time adjust the gate size to fill the cavity properly without allowing the gate set-up time to exceed the nominal wall thickness time. Moreover, such adjustment of the gate size can be accomplished from outside the mold while the mold is running in production.

The gate outer diameter O of FIG. 3 is defined at annular edge 115 in FIG. 2. The diameter O may be made slightly larger than the computer analysis determines as desirable. Likewise, the diameter I of hot probe 100 can be set slightly smaller than the computer analysis determines to be optimum. Thus both the gate area and the gate width X of FIG. 6 may be too large as shown for the best molding conditions. Thus, under this condition the molded part can be molded without critical regard to cycle time, part-to-part balance, molded-in stresses, or gate and molded part "set up" time. In other words, the gate is set to operate under non-optimum conditions as an initial step.

Following this, during preliminary molding trials (while making test shots) the hot probe positions are adjusted stepwise to decrease the gate width X, by increasing diameter I through the advancement of the hot probe, which automatically decreases the area of the annular gate opening. This is done while avoiding internal stresses in the molded part by adjusting the molding parameters, the injection profile (which is the pattern and rate of the ram movement) the packing pressure, the molding cycle, and the simultaneous freezing of the gate and wall thickness of the molded part.

Then, a final cavity-to-cavity balancing in a multiple cavity mold can be done by first continuing to advance the hot probe until "short shooting" takes place in the cavities as visibly seen in the molded parts. Thus, one can avoid parting line "flashing" while balancing the cavities in this manner. Once "short shooting" is determined in a cavity, one reopens the molded gate again by a small step by retraction of the hot probe. The forward frustoconical surface 120 of the hot probe causes rapid opening and closing of the annular gate area as the hot probe is retracted or advanced.

For critical adjustment, the final part-to-part balancing can be done by weighing the mold parts, so that the area of the annular opening of the gate is such, under the conditions of operation, as to be as small and of the minimum area that still permits a full and complete mold shot under the parameters of molding used.

It is therefore a preferred method of operation in using the adjustable gate shown in FIG. 4 to leave the gate in a selected, partially open position, allow the plastic to freeze not only in the mold cavity but also in the gate area, and then open the mold at the parting line and eject the part. As indicated above, when using the mold design shown in FIG. 2, the part will break off in tension across the width shown as "X" which is the weakest section.

As the "X" dimension gets larger, it will take longer for the plastic in the gate area to freeze, but that is not a problem as long as it freezes by the time the plastic in the mold cavity has frozen, because in that event the cycle is not being slowed in order to get freezing in the gate area. It is disadvantage of a gate design if the cycle is slowed because it is necessary to wait for freezing of the plastic in the gate area even after the piece part in the cavity has cooled. The adjustable gate of the present invention permits an operator to control the time of cooling or freezing in the gate area to avoid such disadvantage.

Figure 8:
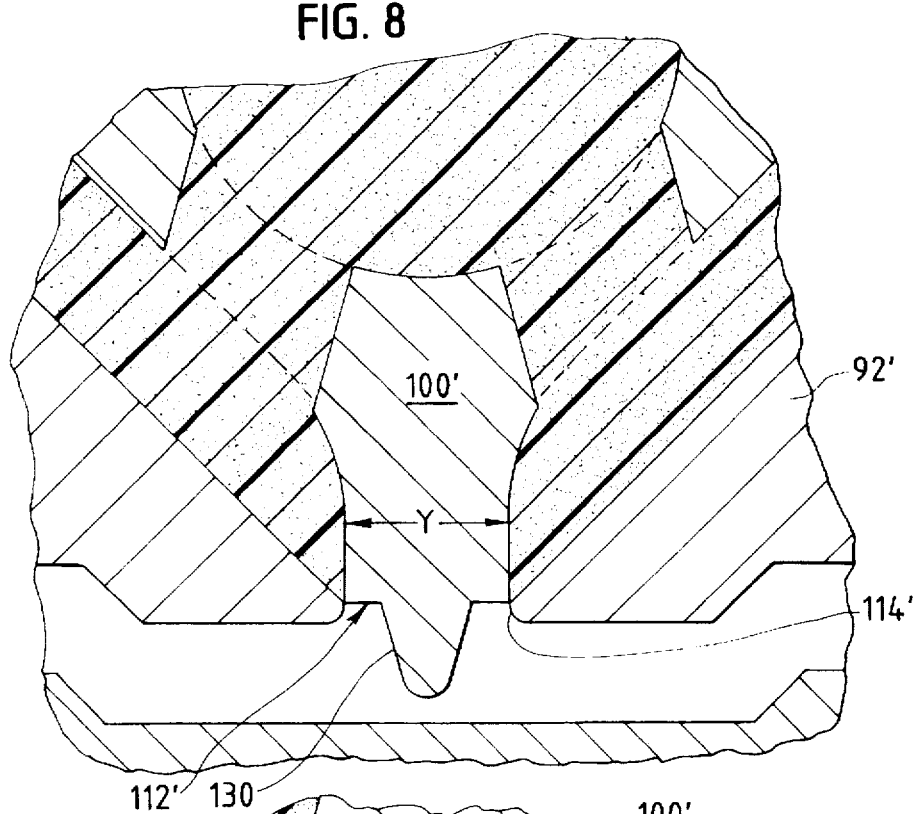
FIG. 8 is a fragmentary vertical section showing another embodiment where the gate opening itself is adjustable from outside the mold, the lower end of the hot probe member having a shape different from FIG. 2, and the probe being shown in its lower, closed position.
Figure 9:
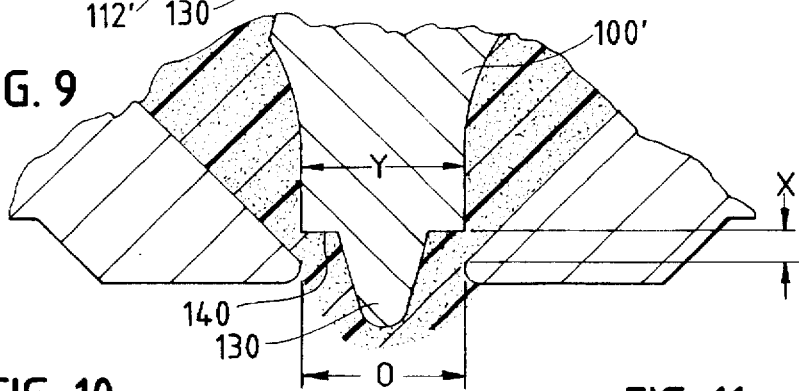
FIG. 9 is a fragmentary view similar to FIG. 8 showing the hot probe in its raised, fully open position.

Reference is now made to FIGS. 8 and 9, which show a variation of the embodiment of FIGS. 1–7, the main difference being in the manner in which the piece part breaks off at the gate when a part is ejected at the end of a cycle. As described above in connection with FIG. 2, at the end of a cycle the piece part is broken off in tension across the section shown as "X" which is the weakest area. In the embodiment shown in FIGS. 8–11, the piece part breaks away in shear rather than in tension due to a variation in the shape of the lower end of a hot probe member 100'.

FIG. 8 shows a fully closed position in which the hot probe 100' is in its lowermost position, and a lower end 112' is in a position to seal off a central opening 114' formed at the bottom of a rotary gate bushing 92'.

Comparing FIG. 2 with FIG. 8, the lower end of the hot probe 100 in FIG. 2 is tapered at 120 with a flat bottom 122. In FIG. 8, the lower end of hot probe 100 is tapered as at 130, but the tapered lower end is much narrower than in FIG. 2. The result is that when viewing the open position as shown in FIG. 9, it can be seen that when the part is ejected and the plastic material beneath the hot probe 100 is pulled down and broken off, the break will occur along vertical shear lines as shown at "X". Thus, in the embodiment of FIGS. 2–7, the plastic part breaks away in the gate area by a tensile break during ejection, whereas in the embodiment of FIGS. 8 and 9, the plastic part breaks away in shear. The main structural difference is the narrow shape of the tapered lower end of the hot probe 100 in FIG. 8.

The gate portion is formed by angles between surfaces 112, '114, '130, when the molding compound is frozen to create a valve section on the molded parts. This prevents any more flow of the plastic material and provides beneficial results. The thinnest section of frozen material of the dimension X shears away, leaving a clean, smooth, face on the flow-in passage between the areas indicated by dimension Y and the 45 degree feed-in angled walls of the system.

Figure 10:
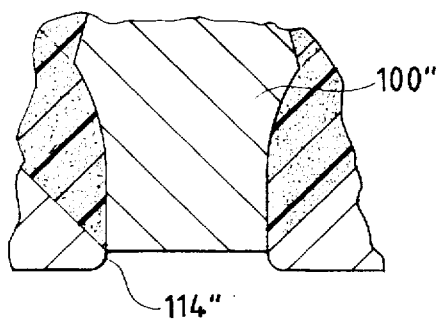
FIG. 10 is a fragmentary, vertical section showing a further embodiment which differs from FIG. 7 in that the bottom of the hot probe member is flat.
Figure 11:
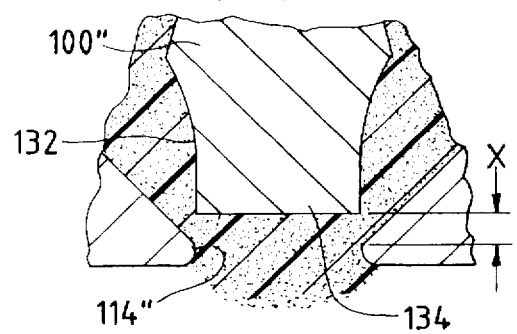
FIG. 11 is a view similar to FIG. 9 showing the hot probe member in is raised, fully open position.

FIGS. 10 and 11 shows a modified form of gate where the part breaks away in shear as in the embodiment of FIGS. 8 and 9. In FIGS. 10 and 11, the lower end of a hot probe 100" is cylindrical in shape as shown at 132, and has a flat bottom 134. The result is that when in an open position as shown in FIG. 11, the part when ejected will break away in shear along the vertical area shown as having a height "X".

In the embodiment of FIGS. 2–7, the annular gate opening or tubular gate has a constant outer diameter as shown at "O" in FIG. 4, and has a variable inner diameter depending on the vertical position of the hot probe 100 due to the tapered lower end 120. In the embodiment of FIGS. 8 and 9, the annular gate opening or tubular gate has a diameter shown at "O" in FIG. 9 which does not vary, and it is the height of the tubular passage which varies depending on the vertical position of hot probe 100', so the dimension shown at "X" in FIG. 9 varies to vary the area of the gate opening. The same is true in the embodiment of FIGS. 10 and 11, but a different structure is used for the lower end of the hot probe 100" which does not require a taper.

Thus, in FIGS. 8 and 9 the lower end of the hot probe 100' has a conical-like nose with a rounded bottom, and in FIGS. 10 and 11 the lower end of hot probe 100" is cylindrical with a flat bottom, but the result is similar, and in each case a vertical shear breakaway area is created which has a constant diameter and a variable height depending on the vertical position of the hot probe 100'.

Some materials after freezing will break away more readily in tension, and some materials will break more readily in shear. Thus, an operator can choose between the embodiment of FIGS. 2–7 where a tensile break is desired, and the embodiments of FIGS. 8–9 and FIGS. 10–11 when a shear break is desired, depending on the characteristics of the plastic material. In using all of the foregoing embodiments, the preferred method is to set the hot probe to achieve a desired tubular gate opening area, and leave the gate set at the selected opening without need to open and close the gate each cycle.

The major advantage of being able to adjust the area of the gate opening in any of the embodiments is that the operator can adjust the gate opening so that freezing of the plastic in the gate area will not take longer than the freezing of the plastic in the mold cavity, so the gate can be adjusted in harmony with the part, as contrasted with use of a fixed size gate opening.

In prior designs, an operator must attempt to adjust the temperature, pressure, and speed of material being forced into the mold cavity in an attempt to balance the freezing time of the piece part in the mold cavity and the freezing time of the plastic in the gate area.

If one is interested in using a gate where the parts break away in shear, it is possible to manufacture the tubular gate opening to a larger or smaller size without varying the vertical dimension shown at "X". Thus, the round opening shown at "O" in FIG. 9 can be made larger or smaller, and the diameter of the probe shown at "Y" in FIGS. 8 and 9 can be made larger or smaller a similar amount, in which case the gate opening can be varied without changing the vertical "X" dimension.

The same principle applies in the embodiment of FIG. 4 where the diameter "O" of the round hole 114 can be varied, and the diameter of the lower end 122 of the hot probe 100 can be varied in a similar manner, and in that way the tubular gate opening can be made larger or smaller without varying the "X" dimension which is the width of the annular passage.

As explained above, the embodiment of FIGS. 8 and 9 and the embodiment of FIGS. 10 and 11 achieve similar results in that each provides a gate where the piece part will break off along a vertical shear path "X". However, the embodiment of FIGS. 8 and 9 will have advantages in certain situations with respect to freezing of the plastic material in the gate area.

In FIG. 11, all of the material in the gate area beneath the lower end 134 of the hot probe 100 must freeze before the part can be ejected. In FIG. 9, the same is true with respect to material beneath the lower surface 140 of the hot probe 100. However, because of the downwardly projecting nose 130, there is less material in the gate area to freeze in the FIG. 9 embodiment. This hot tip probe design may also be used with a very low viscosity molding compound, under circumstances where hot probe 100 moves from the closed position of FIG. 10 to the open position of FIG. 11, being impelled by the gear mechanism for every molding cycle, so that the freezing of the molding compound is not utilized for valving purposes.

Figure 12:
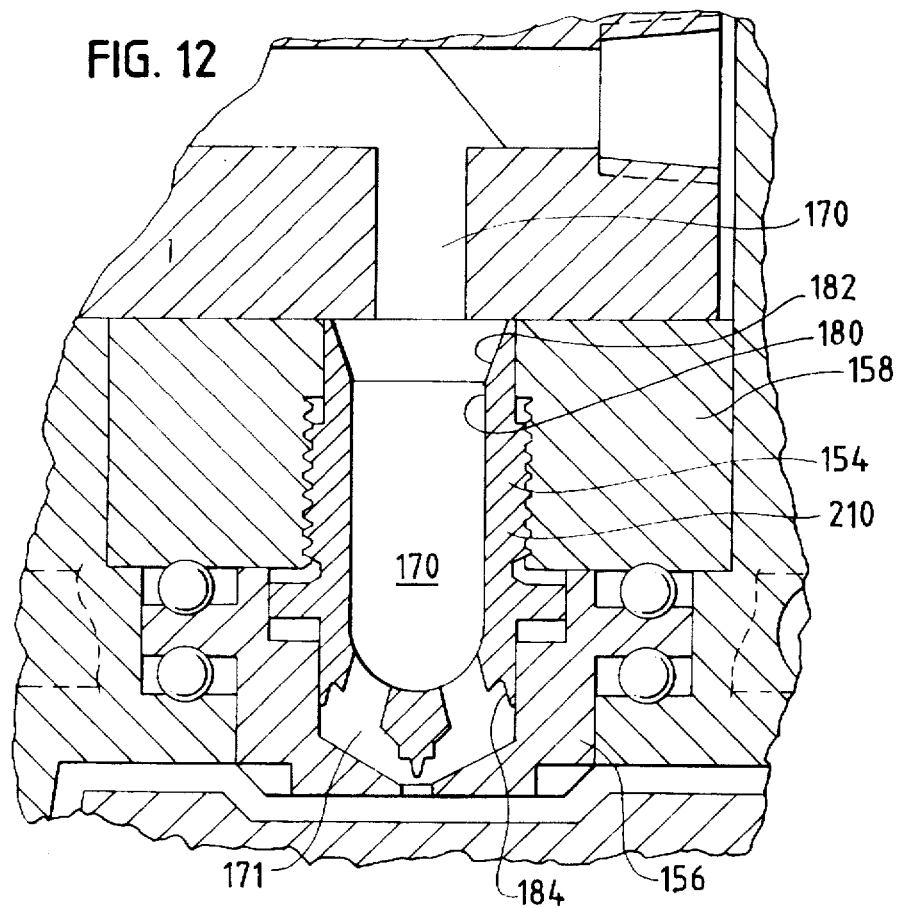
FIG. 12 shows another mold gate embodiment.

FIGS. 12 and 13 are enlarged views of a modified hot probe 154, plus an alternate design 154a, and show the relationship between hot probes and rotary gate bushing 156 and stationary bushing 158. Hot probe 154 is in its raised, fully open position. Hot probe 154 is moved vertically in the same manner as described previously. Also, the flow of the plastic material through passageway 180 through the lower end of the gate assembly is similar to previous embodiments.

A primary purpose of FIGS. 12 and 13 is to illustrate an improved sealing arrangement between the hot probe 154 and the rotary gate busing 156 and the stationary bushing 158, as will now be described. The hot probe 154 has a relatively large diameter central passage 180 through which molten plastic flows downwardly to the area of the adjustable gate. Such molten plastic is passed through the hot probe 154 at a relatively high pressure. In addition, the upper and lower ends of the hot probe are designed to expand radially outwardly in response to such pressure.

As shown in FIGS. 12 and 13, the hot probe 154 has an upper end which tapers at 182 to a thinner, annular wall with the result that the upper end is more capable of expanding radially outwardly under the pressure of the molten plastic 170. Similarly, the lower end is tapered at 184 to a much thinner annular wall thickness. As a result, under internal pressure from the molten plastic 170, the upper end of hot probe 154 will expand radially outwardly at 182 against the surrounding stationary bushing 158, and the lower end of hot probe 154 will expand radially outwardly at 184 against the surrounding rotary gate bushing 156.

The adjustment of the vertical position of the hot probe 154 through rotation of rotary gate bushing 156 is accomplished at a time when there is not high pressure molten plastic inside the hot probe 154, because when the latter expands radially outwardly at its upper and lower ends, 182, 184, it is and held in place not capable of vertical movement relative to rotary bushing 156 and stationary bushing 158. When such internal pressure is applied, the fact that the upper and lower ends of hot probe 154 expand radially outwardly against the surrounding members achieves effective sealing to prevent molten plastic from leaking between the contacting surfaces of the hot probe 154 and the rotary gate bushing 156 and between the contacting surfaces of the hot probe 154 and the stationary bushing 158.

FIG. 13 shows a hot probe 154a, with arrows 212, 214 applied to illustrate how outward pressure and resulting radial expansion at the upper and lower ends 182, 184 of the hot probe can effect sealing of central passage 180. In particular, it is important to note the relatively thin circumferential section 184 at the extreme lower end of hot probe 154 which is where the primary radial expansion and sealing will occur relative to the rotary gate bushing in which the hot probe resides, when pressurized molding compound is present in passage 180 and area 171 (as in FIG. 12).

When using any of the gate embodiments where the size of the gate opening is adjustable, an operator has the option of leaving the gate at one adjusted position for repeated cycles, or the operator may change the gate opening for each cycle, i.e., for each injection of plastic into a mold cavity.

Referring to FIGS. 14–16, another embodiment of a mold gate 200 for conveying molten molding compound to a mold cavity 202 as shown. The mold gate of this embodiment operates in a manner that is similar to that of the previously disclosed embodiments and has similar structure, except as otherwise described herein.

Outer mold gate member 204 has a central circular opening 206 at its inner end through which molten plastic flows to mold cavity 202. As a further improvement, outer mold gate member 204 is a stationary piece, and not rotatable as in the previous embodiment, so that water lines 208, as part of a conventional cooling system, can facilitate and enhance the cooling of molten plastic adjacent to central opening 206.

A hot probe 210 is also shown. Hot probe 210 may be of the specific design illustrated in FIG. 13, having tapered thin annular ends 182, 184 which flex outwardly when molding pressure is elevated in the inner passageway 180 of hot probe 210. Inner passageway 170 is, in turn, fed by central bore 214 of inner bushing 216, which is a stationary structure.

As before, hot probe 210 defines a non-circular flange 218 which is held in a recess 220 of inner mold gate unit 222 in such a manner that hot probe 210 may slide longitudinally relative to inner mold gate unit 222. Also, hot probe unit 210 has external screw threads 224 that engage the internal screw threads 226 of inner bushing 216.

In a manner similar to that of the previous embodiment, inner mold gate unit 222 is rotatable, having external threads 228 that engage a worm gear 230 as in the embodiment of FIGS. 1–7. Thus, as inner mold gate unit rotates, hot probe 210 must rotate with it due to the engagement of flange 218 in the recess of inner mold gate unit 222. Typically, both the flange and recess are of hexagonal shape. As in the previous embodiment, this causes hot probe 210 to rotate relative to the screw threads 226 of bushing 216, and thus to advance or retract, depending on the direction of rotation.

Annular flange 219 serves as a stop to limit the advancement and the retraction of hot probe 210 and thus to prevent damage to the sharp, annular tips, both at the top and the bottom of the probe, from impacting against other parts of the mold. Also, a temperature sensor and wire 221 may be provided, with the sensor extending about $\frac{1}{32}$-inch into the mold cavity adjacent circular opening 206 of the mold gate. Thus, temperature of the molding compound may be directly read, being fed to a microprocessor 223 for providing a feedback control to the molding pressure when the temperature reaches a maximum limit, or for simply providing a temperature readout. Likewise, pressure sensor and wire 225 may also extend through the mold core into the mold cavity adjacent gate aperture 206 for direct pressure sensing of mold pressure. This pressure signal can also go to microprocessor 223, which may exert feedback control in accordance with a predetermined algorithm, or simply provide a readout of the same. Thus, direct readings of temperature, pressure, and other desired data may be obtained with respect to the molding process. Upon removal of the container from mold cavity 202, the container simply slides off of the tiny sensors 221, 225, which, as stated, project only about $\frac{1}{32}$–$\frac{1}{64}$-inch upwardly from the wall of the core.

As a distinction over the embodiment of FIGS. 1–7, it can be seen that the forward end 217 of hot probe 210 does not abut against the moveable inner mold gate unit 222, but rather it abuts against a stationary outer mold gate member 204 with its cooling lines 208. Thus, the inner end of hot probe 210 tends to operate under cooler conditions than in the previous embodiments, which facilitates the cooling of molding compound in and adjacent to central opening 206.

FIG. 14 shows the gate system 200 in its closed position. FIG. 15 shows the gate system in one of several possible open systems, where molding compound can flow through inner conduit 214 to mold cavity 202. These positions, and any other position possible to the system, are governed by the rotary position of inner mold gate unit 222, which can be controlled from outside of the mold through worm gear 230.

It can also be seen that central opening 206 is defined by an annular, substantially linear edge 228 (FIG. 15) analogous to the annular, substantially linear edge 115 shown in FIG. 2, and possessing the same advantages.

For use of the mold gates disclosed herein, the aligned hot probe member 210 positioned adjacent the opening 206 in the mold gate can be raised or lowered to increase or decrease the area of the annular opening between the hot probe 210 and the central opening 206 defined in outer mold gate member 204.

By a preferred method of this invention, one adjusts the position of hot probe member 210 by means of worm gear 230 to a specific position that approximates an optimum position for the particular molding parameters to be used such as molding pressure, molding compound type and temperature, the size and shape of the cavity, and the like. One then molds a plastic part in cavity 202 under these molding parameters, to obtain a plastic part that is fully formed in the mold cavity; one then slightly moves hot probe member 210 inwardly, to reduce the area of the annular opening between opening 206 and the hot probe member 210, followed by molding another plastic part in the molding cavity under the molding parameters, repeating these steps until, at the molding parameters, the plastic part fails to fully form.

Then, one slightly moves the hot probe member outwardly again to achieve a position where the plastic parts are fully formed with each mold shot, followed by molding a plurality of plastic parts at the desired molding parameters without moving the hot probe member 210.

As a result of this method, the minimum cavity inlet port area position of the hot probe member which provides proper, completely molded parts at the specific molding parameters may be determined. At this position, the mold gate may be spontaneously closed during each shot by the freezing of hot plastic in and adjacent the annular passage defined within central opening 206. Thus, the gate is spontaneously closed as the mold opens on its parting line, this freezing taking place simultaneously with the freezing and hardening of the mold part itself without any loss of time in the mold cycle, above and beyond that time which is necessary for the proper freezing of the molded part itself. Additionally, no metal valve is required for closing of the mold gate, since frozen molding compound in opening 206 serves to prevent flow out of the gate until the next mold shot.

The volume of the frozen molding compound in the annular opening at opening 206 is so small that, upon each additional mold shot, the frozen molding compound is broken loose and quickly remelted under the high pressures used to force molding compound into cavity 202. However, since no metal part is used to open or close the mold gate 200, the molding conditions can remain that much more uniform, so that large numbers of molded parts can be produced under the specific molding parameters and a constant area of the annular opening at opening 206. However, in the event of a need for a change, worm gear 230 can be manipulated from the exterior to either open or close the annular opening to a great or a slight degree, depending on the requirements.

It is preferred to hold the molding pressure on the molding compound in the cavity and gate throughout the time that is required for it to freeze. Thus, there is no need for any mechanism to close the valve except for the inherent mechanism of freezing in the annular opening 206. There is no "spring back" of molding compound taking place because of this, which helps to make a stress free part. Also, by this method the plastic can go into the mold cavity under conditions which result in less heat degradation.

The gate of this invention can have a much longer life cycle, since it is moved much less than in a situation where a gate with opening and closing metal parts is used. Because of this, the thin knife edge portions 228 that define the aperture 206 of the outer mold gate member will be less likely to break.

The mold gates of this invention can be used in stack molds, unlike many of the prior art counterparts, since back entry for molding compound is available in the designs of this invention.

Also, the mold gates of this invention are free of central rods, but instead carry molding compound flow conduits that are substantially coaxial with the rest of the gate. The presence of the central rods used in the prior art causes "laminations", which are plastic flakes that freeze on the rod and then are swept off the rod and moved forward into the mold cavity, do to difficulties in controlling the temperature of the rod. By preferred embodiments of this invention, the rod can be dispensed with, being replaced by the central mold conduit 88, 180, 214, leading to the central opening 115, 206.

The above has been offered for illustrative purposes only, and is not intended to limit the scope of the invention of this application, which is as defined in the claims below.

Which is claimed is:

1. A mold gate for controlling the flow of molten plastic to a mold cavity for the injection molding of plastic parts, which mold gate comprises, in combination: an outer mold gate member having a central opening at an inner end through which molten plastic flows to a mold cavity, a hot probe centrally disposed adjacent to said central opening to define an annular passage between said hot probe and said central opening, said hot probe being longitudinally adjustable relative to said outer mold gate member to vary the area of a said annular passage, and apparatus for adjusting the longitudinal position of said hot probe to adjust the area of said annular passage and thereby control the flow of molten plastic to said mold cavity, said hot probe defining a central, longitudinal passageway through the length of said hot probe which communicates at an outer end with a source of molten plastic, and which communicates at an inner end with said annular passage, said hot probe being seated in a rotatable outer mold sleeve to be rotatable with said outer sleeve, said hot probe being threadedly engaged with an inner bushing having a passageway communicating with the central longitudinal passageway of the hot probe for said communication with the source of molten plastic, whereby rotation of said outer mold sleeve causes said hot probe to both rotate and to move longitudinally as guided by the threaded interengagement with the inner bushing, to permit adjustment of the size of said annular passage by longitudinal movement of the hot probe.

2. The mold gate of claim 1 in which said outer mold gate member carries cooling water lines to facilitate the cooling of plastic adjacent said hot probe and in said mold cavity.

3. The mold gate of claim 1 in which said hot probe and outer mold gate member are proportioned to close said annular passage with an annular seal line defining a substantial point in cross section.

4. The mold gate of claim 3 in which said hot probe defines at least one of a relative thin annular, upper end and a relatively thin annular, lower end, to facilitate radial expansion of the relatively thin end when molten plastic is forced under high pressure through said hot probe, whereby said relatively thin end provides an annular pressure seal preventing leakage of molten plastic.

5. The mold gate of claim 4 in which said hot probe and outer mold gate member are proportioned to close said annular passage with an annular seal line defining a substantial point in cross section.

6. The mold gate of claim 1 in which said hot probe defines at least one of a relatively thin annular, upper end and a relatively thin annular, lower end, to facilitate radial expansion of the relatively thin end when molten plastic is forced under high pressure through said hot probe, whereby said relatively thin end provides an annular pressure seal preventing leakage of molten plastic.

7. The mold gate of claim 1 in which said hot probe defines a forward end which is of frustoconical shape.

8. A mold gate for controlling the flow of molten plastic to a mold cavity for injection molding plastic parts, the improvement comprising, in combination: an outer mold gate member having a central opening at an inner end through which molten plastic flows to a mold cavity, a hot probe centrally disposed adjacent to said central opening to define an annular passage between said hot probe and said central opening, said hot probe being longitudinally adjustable relative to said outer mold gate member to vary the area of said annular passage, and apparatus for longitudinally adjusting the position of the hot probe to adjust the area of said annular passage, and thereby to control the flow of molten plastic to said mold cavity, in which said outer mold gate member carries cooling water lines to facilitate the cooling of plastic adjacent said hot probe and said mold cavity said hot probe defining at least one of a relatively thin, annular upper end and a relatively thin annular lower end to facilitate radial expansion of the relatively thin end when molten plastic is forced under high pressure through said hot probe, whereby said relatively thin end provides an annular pressure seal preventing leakage of molten plastic.

9. The mold gate of claim 8 in which said hot probe is seated in a rotatable inner mold gate unit, to be rotatable with said inner unit, said hot probe being threadedly engaged with an inner bushing, whereby rotation of said outer mold gate member causes said hot probe to rotate and to move longitudinally as guided by the threaded engagement with the inner bushing, to permit adjustment of the size of said annular passage by longitudinal movement of the hot probe.

10. The mold gate of claim 9 in which said hot probe defines a relatively thin, annular upper end and a relatively thin, annular lower end, to facilitate radial expansion of said relatively thin ends when molten plastic is forced under high pressure through said hot probe, whereby said relatively thin ends provide an annular pressure seal preventing leakage of molten plastic.

11. The mold gate of claim 10 in which said hot probe defines a forward end which is of frustoconical shape.

12. The mold gate of claim 8 in which said hot probe defines a relatively thin, annular upper end and a relatively thin, annular lower end, to facilitate radial expansion of said relatively thin end when molten plastic is forced under high pressure through said hot probe, whereby said relatively thin ends provide an annular pressure seal preventing leakage of molten plastic.

* * * * *